United States Patent [19]

Tsunashima et al.

[11] Patent Number: 5,051,475

[45] Date of Patent: Sep. 24, 1991

[54] POLYESTER-BASED FILM

[75] Inventors: Kenji Tsunashima, Kyoto; Takashi Mimura; Takashi Sumiya, both of Ootsu; Hiroshi Kuboyama, Ootsu, all of Japan

[73] Assignee: Toray Industries, Inc., Tokyo, Japan

[21] Appl. No.: 453,715

[22] Filed: Dec. 20, 1989

Related U.S. Application Data

[62] Division of Ser. No. 168,944, Mar. 16, 1988, Pat. No. 4,908,277.

[30] Foreign Application Priority Data

Mar. 16, 1987 [JP] Japan .................................. 62-59009
Aug. 18, 1987 [JP] Japan ................................ 62-204809

[51] Int. Cl.$^5$ ........................ C08L 67/02; C08L 25/18
[52] U.S. Cl. .................................... 525/175; 525/176; 525/177
[58] Field of Search ................. 525/132, 175, 177, 176

[56] References Cited

U.S. PATENT DOCUMENTS

| | | |
|---|---|---|
| 3,018,189 | 1/1962 | Traver . |
| 3,136,655 | 6/1964 | Wolinski . |
| 3,186,883 | 6/1965 | Frantzen . |
| 3,364,056 | 1/1968 | Seibel . |
| 4,072,769 | 2/1978 | Lidel . |
| 4,224,270 | 9/1980 | Pears . |
| 4,585,687 | 4/1986 | Posey et al. . |
| 4,613,545 | 9/1986 | Chubachi et al. . |
| 4,745,019 | 5/1988 | Posey et al. . |
| 4,748,084 | 5/1988 | Hata et al. . |

FOREIGN PATENT DOCUMENTS 0176017 4/1986 European Pat. Off. .

*Primary Examiner*—Patricia Short
*Attorney, Agent, or Firm*—Birch, Stewart, Kolasch & Birch

[57] ABSTRACT

The present invention is directed to a polyester film comprising at least at its surface portion oriented sulfonic acid groups and/or salts thereof with an orientation degree of 5–100, which has an excellent adhesiveness, especially excellent anti-alkaline adhesiveness. The present invention also makes it possible to provide a polyester film having, in addition to the excellent adhesiveness, an excellent transparency, antistatic property and waterproof property.

6 Claims, No Drawings

POLYESTER-BASED FILM

This application is a divisional of copending application Ser. No. 07/168,944 filed on Mar. 16, 1988, now U.S. Pat. No. 4,908,277.

BACKGROUND OF THE INVENTION

I. Field of the Invention

This invention relates to a polyester film with good adhesion.

II. Description of Related Art

Polyester films are widely used as, for example, as wrapping material, base film for photosensitive materials, base film for magnetic recording materials, printing materials, and so on in a wide variety of fields. In these uses, the polyester films are often adhered to other materials such as photosensitive materials, magnetic recording materials, inks and other films, etc. In these cases it is preferred that the polyester film have good adhesion or receptive properties for the material to which the film is adhered.

Conventional techniques for creating good adhesion for a polyester film include surface activation methods (e.g., U.S. Pat. Nos. 3,018,189, 4,072,769 and 3,364,056) in which the surface of the polyester film is activated by corona discharge treatment, ultraviolet irradiation treatment, plasma treatment, flame treatment or the like; surface etching methods (e.g., U.S. Pat. No. 3,186,883) in which the surface of the polyester film is treated with a chemical such as an acid, alkali, aqueous amine solution, trichloroacetate or the like; and methods (e.g., U.S. Pat. Nos. 4,224,270 and 3,136,655) in which a primer layer made of a polyester, acrylic resin, polyurethane or the like is formed on the surface of the polyester film.

However, most of the above-mentioned conventional methods cannot give the polyester film sufficient adhesion Further, even in cases where the polyester film exhibits good adhesion to a material having similar chemical structure to the polyester, if the composite film comprising the polyester film and is immersed in aqueous ammonia solution or in boiling water, the material is often peeled off from the polyester film or the polyester film often hazes.

SUMMARY OF THE INVENTION

Accordingly, an object of the present invention is to provide a polyester film having excellent adhesion, especially alkaliproof adhesion to various materials.

Another object of the present invention is to provide a polyester film having, in addition to the excellent adhesion, excellent antistatic property and waterproof property.

The present invention provides a polyester film comprising at least in its surface portion oriented sulfonic acid groups and/or salts thereof with an orientation degree of 5-100.

Since the polyester film of the present invention has a good adhesion to various materials such as photosensitive materials, magnetic recording materials, inks and the like, it can be used as an excellent base film for these materials.

DETAILED DESCRIPTION OF THE PREFERRED EMBODIMENTS

The polyester which is the major component of the polyester film of the present invention is a macromolecule having polyester bonds in the principal chain, which is obtained by polycondensation of a dicarboxylic acid and a diol. Representative examples of the polyester which may be employed in the present invention include polyethyleneterephthalate, polybutyleneterephthalate, polyethylenenaphthalate, and polyethylene $\alpha$, $\beta$-bis(2-chlorophenoxy)ethane-4,4'-dicarboxylate, as well as copolymers thereof and those containing ether bonds in the main chain. In many cases, the advantageous effects of the present invention are greater when the polyester is homopolymer rather than copolymer. Although the polyester film of the present invention may preferably be those oriented and crystallized by biaxial stretching and heatsetting, uniaxially stretched and heatset film may also be used. The polyester film of the present invention may contain conventional additives such as stabilizers, viscosity-adjusting agents, antioxidants, fillers, lubricants, slip agents, antistatic agents, antiblocking agents and so on. The thickness of the polyester film is not important and may be, for example, 0.5 to 1000 $\mu$m.

As mentioned above, the polyester film of the present invention comprises oriented sulfonic acid groups and/or salts thereof with prescribed orientation degree at least in the surface portion thereof. Thus, the polyester film of the present invention may comprise the oriented sulfonic acid groups and/or salts thereof in the entire mass of the film. Alternatively, the polyester film may be a composite film which comprises a polyester-based base film and a surface layer laminated on at least one surface of the base film, which surface layer contains sulfonic acid groups and/or salts thereof with the prescribed orientation degree.

The sulfonic groups and/or salts thereof may be provided by incorporating a polymer or a copolymer (hereinafter referred to as "polymer (A)") containing the sulfonic groups and/or salts thereof in the entire polyester film or in the surface layer. The content of the polymer (A) in the surface portion of the film may preferably be 3% to 95%, more preferably 10% to 60%, still more preferably 15% to 30%.

Preferred examples of the polymer (A) may include copolymers of styrenesulfonic acid represented by the formula [I] with one or more comonomers selected from the group consisting of acrylic acid, acrylic acid esters, methacrylic acid, methacrylic acid esters and styrene; as well as styrenesulfonic acid homopolymer.

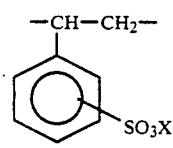

Preferred "X" in the formula [I] includes H+, Na+, Li+, NH4+and Ca+. Among these, most preferred are NH4+ and H+.

Among the above-described preferred polymer (A), especially preferred are sulfonated polystyrene and/or salts thereof in view of the waterproof property and alkaliproof property.

The polymer A preferably has a weight average molecular weight of 1000 to 5,000,000, more preferably 2000 to 1,000,000. In cases where the polymer (A) is a copolymer, the copolymerization ratio of the monomer containing the sulfonic acid group or a salt thereof may preferably be 40–100 mol % in view of the waterproof and alkaliproof adhesion.

Although the polymer (A) alone may be blended in the entire polyester film or may be coated as the surface layer, it is preferred that the polymer (A) be blended in the entire film or coated as the surface layer in the form of a mixture with another polymer or copolymer (hereinafter referred to as "polymer (B)"). Preferred examples of the polymer (B) may include water-soluble or water-dispersible polymers and copolymers such as polyester resins, acrylic resins, polyamide resins, urethane resins, vinyl resins, butadiene resins, epoxy resins, silicone resins and mixtures thereof. Among these, in view of the adhesiveness and transparency, polyurethanes, polyesters and acrylic resins are especially preferred. It should be noted that in cases where the polymer (B) is a polyester and the polymers (A) and (B) are coated as the surface layer, the resulting film is a composite film having the above-mentioned polyester-based base film and a polyester-based surface layer containing the sulfonic acid groups and/or salts thereof.

Preferred examples of the polymer (B) will now be described in more detail.

Preferred examples of the polyurethanes may include those containing at least one of carboxylic acid base, sulfonic acid base and sulfuric acid semiester base, especially in the form of ammonium salt.

Preferred examples of the polyester as the polymer (B) may include polyester copolymers in which 0.5–20 mol % of 5-sulfosodium isophthalic acid or 1–30 mol % of polyethyleneglycol or ethyleneoxidepropyleneoxide is copolymerized. Among these, polyesters containing as the acid component at least one of terephthalic acid, isophthalic acid, naphthalenedicarboxylic acid, diphenyldicarboxylic acid and as the diol component at least one of hexane glycol, 1,4-butanediol, diethyleneglycol, neopentylglycol, tetramethyleneglycol and polyethyleneglycol, which polyesters have a viscosity of 3–6 cps when diluted with water to a concentration of 5% by weight, are especially preferred since they are excellent not only in adhesiveness and antistatic property, but also in smoothness and gloss.

Preferred acrylic resins as the polymer (B) are those containing as the major constituent alkylacrylate, alkylmethacrylate or alkylbutyrate especially those containing 30–99.9 mol % of alkylacrylate, alkylmethacrylate or alkylbutyrate and 70–0.01 mol % of one or more vinyl monomers copolymerizable with the alkyl(meth)acrylate and one or more functional groups, which are water-soluble or water-dispersible, have an average number molecular weight of 200,000 to 1,000,000.

The content of the alkylacrylate, alkylmethacrylate or the alkylbutyrate in the above-mentioned preferred acrylic resins is 30 mol % or more because the coating layer is easily applied to the base film and the strength and antiblocking property are good. The reason why the content of the alkylacrylate, alkylmethacrylate or the alkylbutyrate in the above-mentioned preferred acrylic resins is 99.9 mol % or less is that incorporating a monomer with a functional group as a copolymerization component makes it possible to promote water-solubility or water-dispersibility of the resin and to stabilize the aqueous solution or dispersion for a long time, as well as to promote the adhesion between the polyester base film and the surface layer, to promote the strength, waterproof property and chemical resistance of the surface layer by the reaction in the surface layer, and to promote the adhesion between the film of the present invention and other materials.

Preferred examples of the alkyl groups of the alkylacrylate, alkylmethacrylate or alkylbutyrate may include methyl group, ethyl group, n-propyl group, isopropyl group, n-butyl group, isobutyl group, t-butyl group, 2-ethylhexyl group, lauryl group, stearyl group and cyclohexyl group.

Preferred functional groups contained in the vinyl monomer are those which improve hydrophilicity of the resin to promote the water-solubility or water-dispersibility of the resin, and those which improves the adhesion of the resin to the base film or to the other materials. Examples of the preferred functional groups may include carboxylic group and salts thereof, acid anhydride groups, sulfonic acid group and salts thereof, amide group and alkylolamide group, amino group (including substituted amino group) and alkylol amino group, and salts thereof, hydroxide group and epoxy groups. Among these, especially preferred are carboxylic group and salts thereof, acid anhydride groups and epoxy groups in view of the adhesiveness, water-solubility and water-dispersibility. Two or more of these functional groups may be contained in the resin.

Preferred examples of the vinyl monomer containing carboxylic acid or a salt thereof, or acid anhydride may include acrylic acid, methacrylic acid, itaconic acid, maleic acid, fumaric acid and crotonic acid, as well as metal salts such as sodium salt thereof, ammonium salt thereof, and maleic anhydride.

Preferred examples of the vinyl monomer containing sulfonic acid group or a salt thereof may include vinyl sulfonic acid, metal salts such as sodium salt thereof and ammonium salt thereof.

Preferred examples of the vinyl monomer containing amide group or alkylolamide group may include acrylamide, methacrylamide, N-methylmethacrylamide, methylolacrylamide, methylolmethacrylamide, ureidovinyl ether, β-ureidoisobutylvinyl ether and ureidoethylacrylate.

Preferred examples of the amino group and alkylolamino group may include diethylaminoethylvinyl ether, 2-aminoethylvinyl ether, 3-aminopropylvinyl ether, 2-aminobutylvinyl ether, dimethylaminoethylmethacrylate and dimethylaminoethylvinyl ether, as well as derivatives thereof which has methylolamino group instead of amino group or of which amino group is converted to a quaternary salt by halogenated alkyl, dimethyl sulfate, sultone or the like.

Preferred examples of the vinyl monomer containing hydroxide group may include β-hydroxyethylacrylate, β-hydroxyethylacrylate, β-hydroxyethylmethacrylate, β-hydroxyvinyl ether, 5-hydroxypentylvinyl ether, 6-hydroxyhexylvinyl ether, polyethyleneglycolmonoacrylate, polyethyleneglycolmonomethacrylate, polypropyleneglycolmonoacrylate and polypropylelneglycolmonomethacrylate.

Preferred examples of the vinyl monomer containing an epoxy group may include glycidylacrylate and glycidylmethacrylate.

As the polymer (B), the following compounds, for example, may also be used: acrylonitrile, methacrylonitrile, styrenes, butylvinyl ether, mono- and di-alkyl maleate, mono- and di-alkyl fumarate, mono- and di-alkyl itaconate, methylvinyl ketone, vinyl chloride, vinylidene chloride, vinyl acetate, vinylpyridine, vinylpyrrolidone and vinyltrimethoxysilane.

Although the acrylic resin used as the polymer (B) may contain a surfactant, low molecular weight surfactant contained in the acrylic resin may be coagulated in the film-forming process and may be accumulated at the interfaces among the particles or may be transferred to the interface of the surface layer to deteriorate the mechanical strength, waterproof property and adhesion between the surface layer and the base film. In such a case, acrylic resins which do not contain a surfactant obtained by so called soap-free polymerization may preferably be used.

Among these acrylic resins, especially preferred are the water-dispersible acrylic resins containing as the principal chain a copolymer of methyl, ethyl or butylmethacrylate-methyl, ethyl or butylacrylate copolymer with a copolymerization ratio of 35/65-65/35 (molar ratio) and further contain —COOH and —CH$_2$OH in the amount of 1-5% by weight, respectively.

The mixing ratio of the polymer (A) to the polymer (B) may preferably be 10-95% by weight, more preferably 15-30% by weight in view of obtaining adhesion, waterproof property, alkaliproof property, strength and antistatic property.

To improve the blocking propensity, heat resistance, solvent resistance and mechanical strength of the surface layer, reactive compounds such as methylolurea resins, alkylolurea resins, melamine resins, acrylamide resins, polyamide resins, as well as epoxy compounds, aziridine compounds, block polyisocyanate and vinyl compounds may be incorporated in the surface layer as a cross-linking agent. Further, the surface layer may contain, if desired, defoaming agents, coating property improvers, viscosity-increasing agents, organic lubricants, antioxidants, ultraviolet absorbers, foaming agents, dyes, pigments and the like. Further, the surface layer may contain inorganic particles with a particle size of, for example, 1 μm or less, preferably 0.5 μm or less, more preferably 0.2 μm or less. Preferred examples of the materials constituting the particles include kaolin, silica, silica sol, calcium carbonate, titanium oxide, barium salt, alumina, molybdenum sulfide, carbon black and zirconium compounds.

Incorporation of laminated silicate which exhibits swelling in the surface layer is also preferred in view of obtaining good adhesion and high strength of the surface layer. Examples of such laminated silicate may include montmorilonite, vermiculite, hectorite, taeniolite and tetrasilicic mica.

Although the thickness of the surface layer is not restricted, it is usually 0.001-5 μm, preferably 0.01-0.4 μm, more preferably 0.04-0.2 μm in view of the good adhesion and antistatic property.

The sulfonic acid groups and/or salts thereof must be aligned so as to have an orientation degree of 5-100, preferably 20-80. By the alignment of the sulfonic acid groups and/or salts thereof, the adhesion to various materials, particularly diazo coatings, UV inks, gelatin compositions are largely improved, and the adhesion becomes resistant to water treatment and alkali treatment. More particularly, if the orientation degree is less than 5, the adhesion is largely weakened by processing such as alkali treatment, so that the film cannot have practically acceptable adhesion. On the other hand, if the orientation degree is more than 100, small cracks, projections and recesses may be formed in the surface portion to deteriorate the transparency and antistatic property. In addition, the adhesion is sharply weakened by boiling treatment or alkali treatment, so that it cannot be used in practice. Thus, unless the orientation degree of the sulfonic acid groups and/or salts thereof is in the range of 5-100, good adhesion which is waterproof and alkaliproof cannot be obtained.

The specific alignment of the sulfonic acid groups and/or salts thereof cannot be attained by merely coating a mixture of the polymer (A) and polymer (B) on the base film or by merely blending a mixture of the polymer (A) and polymer (B) in the polyester film. Therefore, even if a mixture of 0.5-15 parts by weight of an electroconductive macromolecular electrolyte containing sulfonic acid salt and 100 parts by weight of acrylic copolymer is used as a plastic coating as disclosed in Japanese patent disclosure (Kokai) Nos. 86526/79 and 93025/79, although the antistatic property and heatsealability may be promoted, adhesion cannot be improved.

The specific alignment of the sulfonic acid groups and/or salts thereof can only be attained by stretching the film under specific conditions hereinafter described in detail. The alignment of the sulfonic acid groups and/or salts thereof is such that not only the principal chains of the polymer to which the sulfonic acid groups and/or salts are attached are aligned in parallel to the surface plane of the base film, but also the sulfonic acid groups and/or salts thereof are aligned in parallel to the surface plane of the base film because of the strong polarity thereof. Unless the stretching is conducted under specific conditions, the sulfonic acid groups and/or salts thereof do not align not only in the plane, but also in the direction of thickness of the film (i.e., the sulfonic acid groups and/or salts thereof do not align in the direction of thickness of the film, i.e., perpendicularly to the film surface.

For attaining the specific alignment of the sulfonic acid groups and/or salts thereof, in cases where the surface layer containing the sulfonic acid groups and/or salts thereof is formed on the base film, a coating solution containing the polymer (A) (and preferably polymer (B)) is applied on the base film and then the base film is stretched at least in one direction. In cases where a biaxially stretched film is to be produced, it is preferred that the coating solution be applied on the base film after stretching the film in one direction and before stretching the film in another direction. At the time of stretching the film after coating the solution, it is preferred that the coated solution do not contain water. That is, the coated solution is preferably dried completely before the stretching. To accomplish this, it is effective to prolong the preheating time, to raise the stretching temperature and to increase the stretching velocity in the range of not causing film breakage or necking stretching. Specifically, the concentration of the polymer(s) in the coating solution may preferably be 3-20% by weight, more preferably 5-10% by weight, and the stretching temperature may preferably be 98-180° C., more preferably 110-150° C. The stretching velocity should be selected depending on the stretching temperature and may be, for example, 10,000%/min. to 400,000%/min.

To attain the specific alignment of the sulfonic acid groups and/or salts thereof, it is important that water exist in the atomosphere in which the stretching of the film is conducted. This can be attained by conducting the stretching in pressurized water or in the presence of pressurized steam. The relative humidity at the surface of the film to be stretched should be not less than 10%, preferably not less than 25%. Thus, the fact that the coated solution does not contain water (i.e., dried) but water is supplied only to the surface portion of the coated layer (or only to the surface portion of the polyester film in cases where the polymer (A) is blended in the entire polyester film) from the atomosphere makes it possible to strongly align the sulfonic acid groups and-/or salts thereof to attain the orientation degree defined in the present invention.

A typical manufacturing process of the polyester film of the present invention which has a base film and the surface layer will now be described in more concretely. It should be noted, however, the manufacturing process is not restricted to the method.

Well dried pellets of polyester are supplied to a conventional extruder which preferably has a compression ratio of not less than 3.8. The pellets are then melted in the extruder at a temperature lower than the decomposition temperature of the polyester and the molten polyester is extruded through a slit-shaped die to form a sheet. The sheet is cooled and solidified to obtain a non-stretched sheet. The non-stretched sheet is then stretched in the longitudinal direction at 80°–180° C. with a draw ratio of 3–8 times the original length. Then the coating composition containing at least the polymer (A) is then applied to the film. The film is then subjected to a preheating step to dry the coated solution and the resulting film is then stretched in the transverse direction at a draw ratio of 3–6 times the original length while humidifying the film by pressurized steam with a temperature of 98°–180° C. If desired, the resulting film may be heatset at 150°–250° C. for 0.1–10 seconds while relaxing by 0–10% in the transverse direction. Further, if desired, the resulting film may be stretched again in the longitudinal direction at a draw ratio of 1.1–1.7 times the original length.

In the manufacturing process just mentioned above, the coating composition may be applied by any of the conventional methods including gravure coating, reverse coating, spray coating, kiss coating, die coating and metering rod coating. It should be noted, however, the surface layer containing the polymer (A) may also be formed by employing extrusion lamination method and melt coating method, although application of the coating composition is a better method for forming a thin surface layer.

Although not required, to further promote the coating property of the surface layer and the adhesion between the base film and the surface layer, the base film may be subjected to a chemical treatment, anchor treatment using a conventional anchor-coating agent such as urethane resin and epoxy resin or to discharging treatment such as corona discharging treatment, as conventional.

The polyester film of the present invention which contains sulfonic acid groups and/or salts thereof in the entire film may also be produced in the same manner as described above except that the polymer (A) is blended in the starting material instead of applying the coating composition.

In cases where the polyester film of the present invention is a composite film comprising the polyester-based base film and the surface layer containing the sulfonic acid groups and/or salts thereof, the base film may also contain a polymer or a copolymer having sulfonic acid groups and/or salts thereof. In this case, the adhesion between the base film and the surface layer may be further improved. The content of the polymer or the copolymer having sulfonic acid groups and/or salts thereof may preferably be 5 ppm to 20% by weight.

Preferred polymers or copolymers to be blended in the base film are those containing as the monomer unit a metal salt such as Li, Na, Mg, Zn and Mn salt of sulfoisophthalic acid unit, sulfoterephthalic acid unit, sulfonaphthalene dicarboxylic acid unit and ester-forming derivatives thereof. Among these, polyester compounds comprising as the acid component terephthalic acid, isophthalic acid or the like containing 5-sodium sulfoisophthalic acid and 5-sodium sulfodimethylisophthalic and comprising as the diol component ethyleneglycol, butanediol, polyethyleneglycol, polytetramethyleneglycol or the like are especially preferred. The content of the polyester compounds may preferably be 1–20% by weight in view of the heat stability and adhesion.

The base film containing the sulfonic acid groups and/or salts thereof may be one containing the above-described coating composition. In this case, the amount of the coating composition added may preferably be 5 ppm to 2% by weight in view of obtaining good adhesion and surface smoothness.

The polyester film of the present invention may suitably be used as, for example, wrapping materials such as those for IC, photosensitive materials such as microfilms, magnetic recording base, various plates for printing, tracing films, films for electronphotograph, films for overhead projector, base films for offset printing inks, ultraviolet-set inks and for cellophane inks.

The method of measuring the characteristics and criteria for evaluation thereof will now be described in summary.

(1) Adhesiveness

The coating material (a), (b) or (c) described later was coated on a sample film and a plurality of cross-shaped cuts were formed (100 cuts/cm$^2$) in the resulting coating such that the crosses align in the same direction. To the cross-cut surface, a cellophane tape (Cello-Tape CT-24, manufactured by Nichiban Co., Ltd.) was sticked such that the direction of the tape forms an angle of 45° to the cuts. The tape was pressed with a hand roller with a force of about 5 kg, which hand roller was moved back and forth 10 times, to pressure-stick the cellphane tape. The tape was then peeled off by hand and the peeling of the coating was observed and evaluated. The criteria of evaluation were as follows:

Mark ○ : Good (Peeled area was less than 5%) p1
Mark Δ : Somewhat Inferior (Peeled area was not less than 5% and less than 20%)
Mark × : Bad (Peeled area was not less than 20%)

Coating (a):
Ultraviolet-set type ink (UV ink) "FDO (black)" (manufactured by Toyo Ink Co., Ltd.) was coated with a gravure roll coater to a thickness of about 5 μm and the coated ink was treated with an UV lamp having a irradiation power of 80W/cm with an irradiation distance of 10 cm for 8 seconds.

Coating (b):
Polyvinyl alcohol with a degree of polymerization of 1500 and a degree of saponification of 90 mol % was dissolved in water and the resulting solution was coated on the film so as to form a coating with a dry thickness of about 5 um. After the coating, the coated solution was dried at 130° C. for 2 minutes.

Coating (c):
Commercially available cellulose ("CBA381-05", manufactured by Nagase Sangyo Co., Ltd.) for diazo binders was dissolved in ethyl acetate to a concentration of 10% by weight and the resulting solution was coated with a bar coater. The resulting coating was then dried at 110° C. for 1.5 minutes to form a coating layer with a thickness of 5.0 μm.

(2) Transparency

The haze measured using "SEP-H-2" type turbidimeter (manufactured by Nippon Seimitsu Kogaku Co., Ltd.) in accordance with the method defined in JIS-K-6714-58.

(3) Antistatic Property

Specific surface resistivity was measured under an applied voltage of 100 V at 20° C., 60% RH by the use of ultra insulation resistance tester MODEL-VE-40 (manufactured by Kawaguchi Denki Kogyo Co., Ltd.).

(4) Waterproof Property

The sample film was immersed in warm water at 50° C. for 30 minutes and then a plurality of cross-shaped cuts were formed (100 cuts/cm$^2$) in the coating layer. Peeling of the coating layer was observed and measured in the same manner as in (1). In cases where abnormity (cloudiness) was found in the surface, even if the evaluation for adhesiveness by the peeling test was good (◯), the sample was evaluated bad (×).

(5) Alkaliproof Property

A film having the above-mentioned coating (c) was immersed in an aqueous ammonia solution with a concentration of 30% by weight for 20 hours and the peeling of the coating was observed and evaluated as in (1).

(6) Solvent Resistance

The coating was rubbed 5 times (back and forth) with an applicator in which an organic solvent, i.e., ethyl acetate, toluene, methylethyl ketone, acetone or isopropanol, was impregnated. The change of the state of the rubbed surface was observed by gross examination or by using a magnifier or a differential interference microscope. The change was compared to a non-treated control The criteria for evaluation were as follows:

Mark ⊙ : did not change at all
Mark ◯ : slightly dissolved
Mark Δ : considerably dissolved but the coating layer remained
Mark × : dissolved and removed almost completely (7) Concentration of Sulfonic Acid Groups and/or Salts Thereof The concentration of the sulfonic acid and/or salt thereof was expressed in terms of the ratio of the relative intensities of $C_{1s}$ to $S_{2p}$ in the uppermost surface of 10 nm thickness, which intensities were measured in the following conditions using an X-ray photoelectron spectrophotometer "ESCA750" (manufactured by Shimazu Corporation):

Excitation X-ray: MgK$\alpha_{1,2}$ Ray (1253.6 eV)
X-ray Power: 8 kV, 30 mA
Temperature: 20° C.
Degree of Vacuum: $10^{-5}$ Pa (8) Degree of Orientation of Sulfonic Acid Groups and/or Salts Thereof The orientation degree of the sulfonic acid groups and/or salt thereof is expressed in terms of the value obtained by multiplying the difference spectrum of the absorbance by 1000, which difference spectrum was measured in the longitudinal and transverse directions in the film plane in accordance with FT-IR-ATR method. More particularly, a Ge plate with an internal reflection number of 25 employed as a high index of refraction medium was set in a Wilks' ATR apparatus, and the difference spectrum was measured by the FT-IR-ATR method such that the difference of the absorbance of the longitudinal and transverse directions at 1450cm$^{-1}$ was set to 0. The film sample was a rectangule measuring 20 mm x 45 mm and was sticked with pressure to the Ge plate, and the spectrum was measured using a polarized light perpendicular to the incident plane. The base line was obtained by drawing a straight line between the absorbances at 1450 cm$^{-1}$ and 1000 cm$^{-1}$. As the absorbance of the orientation, the band of 1155 cm$^{-1}$ was used. The equipment and conditions employed in the FT-IR-ATR measurement were as follows:

Apparatus: IFS-85 (FT-IR manufactured by Bruker)
Light Source: Clover (SiC)
Detector: Deutrium Triglycine Sulfate (DTGS)
Beam Splitter: Ge coat/KBr
Measuring Conditions
  Resolving Power: 4 cm$^{-1}$
  Number of Integration: 1024
  Apodization: Triangle
  Phase Compensation: Mertz method
  Zero Filling: 2
Accessories: Accessories for ATR Measurement (Model-9, manufactured by Wilks)
IRE Ge (52.5×20×2 mm)
Polarizer Wire Grid Type (manufactured by Specac)

EXAMPLES

The present invention will now be described by way of examples The examples are presented for the illustration purpose only and should not be interpreted in any restrictive way.

EXAMPLE 1

Polyethyleneterephthalate with an intrinsic viscosity of 0.62 was melt-extruded at about 280° C., and then cooled on a quenching drum with a temperature of about 35° C. to obtain an amorphous sheet. During this process, an electrostatic charge was deposited on the surface of the sheet. The sheet was stretched in the longitudinal direction at a draw ratio of 3.5 times the original length at about 90° C. Then the coating composition containing the following (A) and (B) was applied:

Sulfonated Polystyrene and/or Salt Thereof (A): Sulfonated polystyrene with a molecular weight of about 70,000 which has H$^+$ as the X$^+$ ion of SO$_2$O$^-$X$^+$.

Acrylic Polymer (B): Acrylic polymer (average molecular weight of 500,000) based on methylmethacrylate/ethylacrylate (50/50 mol %) in which carboxylic group and methylol group are introduced in the amount of 2.5% by weight, respectively.

The mixture of (B)/(A) with a weight ratio of 20/80 was diluted with water to a concentration of 6% by weight, and 0.3% by weight, with respect to the solid content, of colloidal silica with an average particle size of 0.12 μm was added thereto to obtain a coating composition.

The coating was applied to the film using a gravure roll coater to a thickness after biaxial stretching of 0.07 μm, and the film was preheated at 110° C. to sufficiently eliminate water. Then the atmosphere was heated to 145° C. and moistured by raw steam, and the film was stretched in the transverse direction in a tenter at a draw ratio of 4.5 times the original length. Then the film was heatset at 210° C. to obtain a film comprising a base film of 50 μm thickness and a coating of 0.07 μm thickness.

The characteristics of the thus prepared film are shown in Table 1.

TABLE 1

| ITEM | | | RESULTS |
|---|---|---|---|
| Orientation Degree Sulfonic Acid Groups | | | 25 |
| Solvent Resistance | | | ⊚ |
| Adhesiveness | UV Ink | | ○ |
| | PVA | | ○ |
| | CAB | Non-treated | ○ |
| | | Waterproof Testing Treatment | ○ |
| | | Alkaliproof Testing Treatment | ○ |
| Specific Surface Resistivity (Ω/□) | | | $10^9$ |
| Haze (%) | | | 1.5 |

COMPARATIVE EXAMPLE 1

The same procedure as in Example 1 was repeated except that the conditions of preheating and stretching in the transverse direction were changed as shown in Table 2 such that stretching in the transverse direction was conducted before the coated composition is completely dried.

As can be seen from Table 2, unless the sulfonic acid is appropriately aligned in the surface layer, the adhesiveness, especially the adhesiveness after alkali treatment is degraded, so that cannot be practically used.

TABLE 2

| | | Ex. 1 | Comp. Ex. 1 |
|---|---|---|---|
| Conditions of Stretching in Transverse Direction | Preheating Temp. (°C.) | 110 | 80 |
| | Stretching Temp. (°C.) | 145 | 105 |
| | Relative Humidity of Environment of Stretching | 30 | 0 |
| | Method of Moistuning | Steaming | None |
| Orientation of Sulfonic Acid Groups | | Exists | Exists |
| Orientation Degree of Sulfonic Acid Groups | | 25 | 120 |
| Adhesiveness with CAB | Non-treated | ○ | ○ |
| | Waterproof Testing Treatment | ○ | X |
| | Alkaliproof Testing Treatment | ○ | X |
| Specific Surface Resistivity (Ω/□) | | $10^9$ | $10^{13}$ |
| Haze (%) | | 1.5 | 4.0 |

COMPARATIVE EXAMPLE 2

The coating employed in Example 1 was applied to a commercially available biaxially stretched polyester film and dried to obtain a polyester film with a coating layer of 0.07 μm thickness.

The coated surface of the thus obtained film was evaluated as in Example 1 and the results are shown in Table 3. As is apparent from Table 3, no excellent effect such as improved adhesion was brought about.

TABLE 3

| ITEM | | | RESULTS |
|---|---|---|---|
| Orientation Degree of Sulfonic Acid Groups | | | 0 |

TABLE 3-continued

| ITEM | | | RESULTS |
|---|---|---|---|
| Adhesiveness | UV Ink | | Δ |
| | PVA | | X |
| | CAB | Non-treated | Δ |
| | | Waterproof Testing Treatment | X |
| | | Alkaliproof Testing Treatment | X |
| Specific Surface Resistivity (Ω/□) | | | $10^{11}$ |
| Haze (%) | | | 1.8 |

EXAMPLE 2

The same procedure as in Example 1 repeated except that a polyester consisting of 85 mol % of terephthalic acid and 15 mol % of 5-sodium sulfoisophthalic acid as the acid components and ethyleneglycol as the diol component was used in place of polyethyleneterephthalate to obtain a film with a thickness of 50 μm. The adhesiveness of the thus obtained film was evaluated. The results are shown in Table 4.

As can be seen from Table 4, the adhesiveness and transparency are even further improved if the base film contains sulfonic acid salt.

TABLE 4

| ITEM | | | RESULTS |
|---|---|---|---|
| Orientation Degree of Sulfonic Acid Groups | | | 35 |
| Solvent Resistance | | | ⊚ |
| Adhesiveness | UV Ink | | ⊚ |
| | PVA | | ○ |
| | CBA | Waterproof Testing Treatment | ⊚ |
| | | Alkaliproof Testing Treatment | ○ |
| Haze (%) | | | 0.8 |

We claim:

1. A polyester film comprising at least in its surface portion oriented styrenesulfonic acid groups and/or salts thereof with an orientation degree of 5–100, wherein the oriented styrenesulfonic acid groups and/or salts thereof are provided by styrenesulfonic acid polymer or copolymer incorporated in the film.

2. The polyester film of claim 1, wherein the orientation degree is 20–80.

3. The polyester film of claim 1, wherein the oriented styrenesulfonic acid groups and/or salts thereof exist in the entire film.

4. The polyester film of claim 1, wherein the styrenesulfonic acid copolymer is a copolymer of styrenesulfonic acid and at least one copolymerization component selected from the group consisting of styrene, acrylic acid, acrylic acid esters, methacrylic acid and methacrylic acid esters.

5. The polyester film of claim 4, wherein the styrenesulfonic acid polymer or copolymer has a molecular weight of 1000 to 5,000,000 and is present in the surface portion of the film in an amount of 3% to 95%.

6. the polyester film of claim 4, wherein the styrenesulfonic acid polymer or copolymer has a molecular weight of 2000 to 1,000,000 and is present in the surface portion of the film in an amount of 15% to 30%.

* * * * *